Patented Sept. 4, 1934

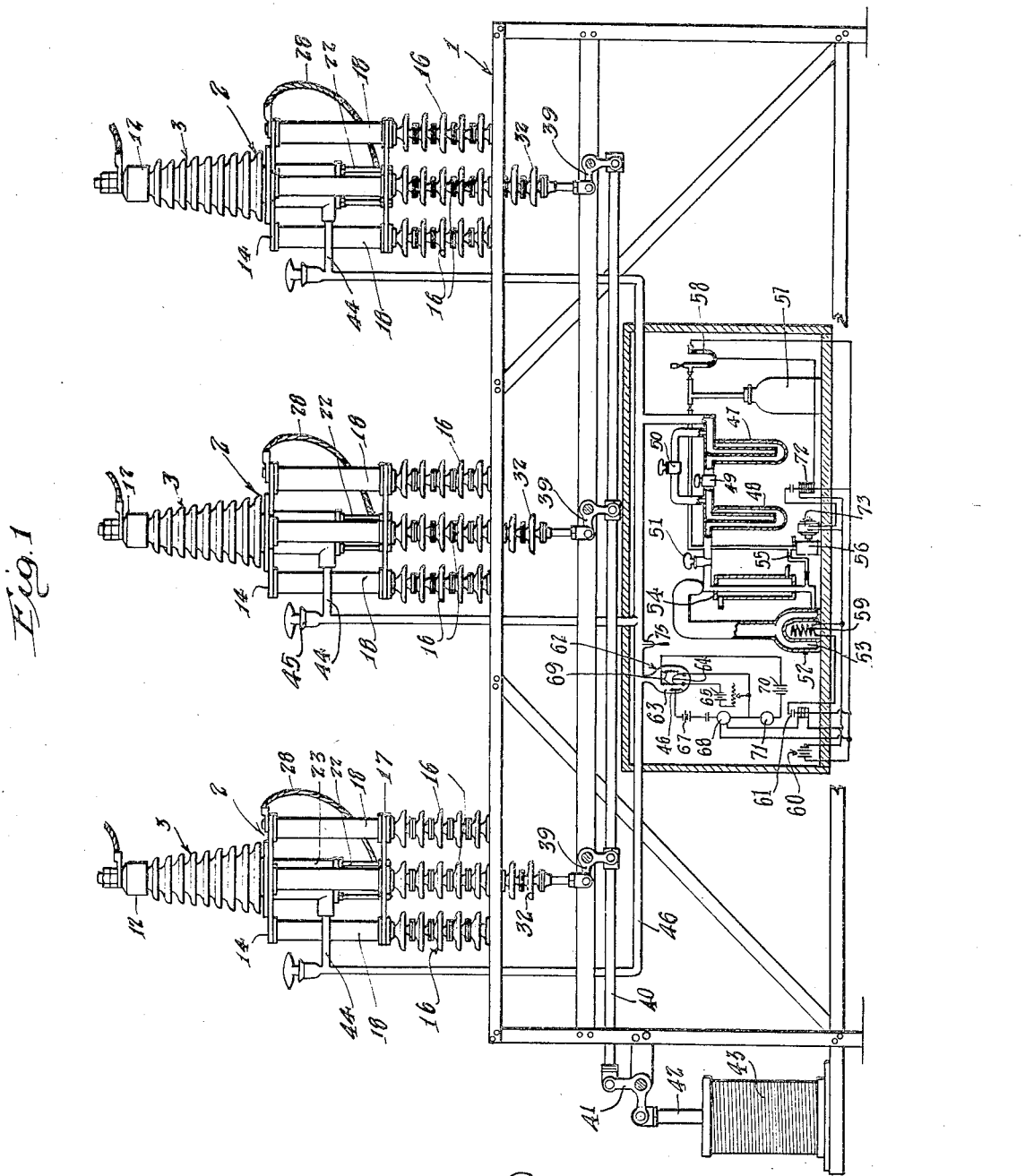

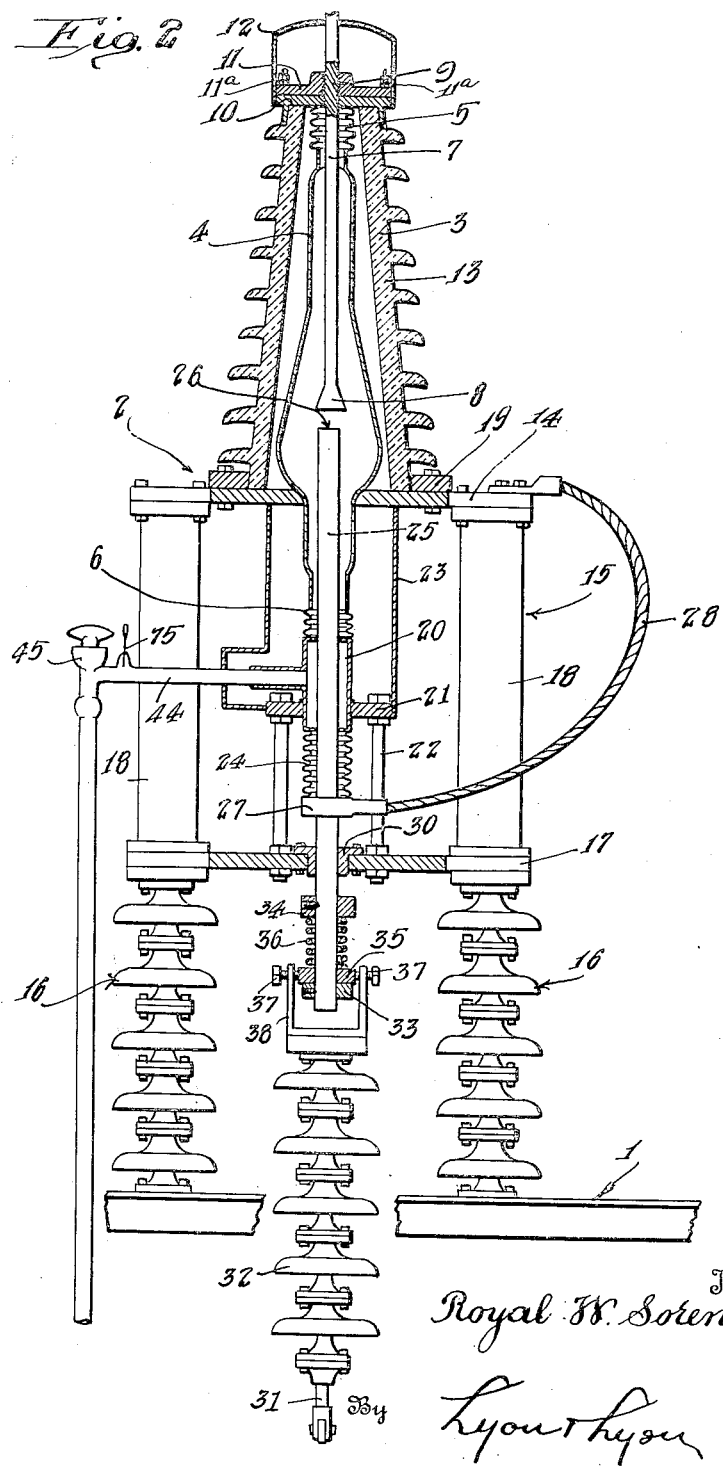

1,972,362

UNITED STATES PATENT OFFICE 1,972,362

ELECTRIC SWITCHING APPARATUS

Royal W. Sorensen, Pasadena, Calif., assignor to California Institute of Technology, Pasadena, Calif., an educational corporation of California Application December 26, 1928, Serial No. 328,464

1 Claim. (Cl. 200—144)

This invention relates to an electrical switching system and apparatus of the type suitable for use in electric power houses and substations and the invention refers particularly to an apparatus embodying switches or current interrupters of the vacuum ambient type.

In the operation of electric power houses and substations, it is necessary to provide for connecting and disconnecting various electric circuits, each with others, according to the demands of the service to be rendered.

In copending applications of Robert A. Millikan and myself, Serial No. 148,418 filed November 15, 1926 now Patent No. 1,784,302 issued December 9, 1930, Serial No. 304,158 filed September 5, 1928 now Patent No. 1,784,303 issued December 9, 1930 and Serial No. 199,580 filed June 17, 1927, there is described a circuit breaker or interrupter in which the electrodes of the interrupter operate in a vacuum ambient, which circuit breaker or interrupter can be employed for switching high current loads at high electrical potential.

The object of the present invention is to provide certain improvements in the mechanical construction and mounting of this type of vacuum circuit breaker and to provide a system or apparatus including one or more of such circuit breakers or interrupters connected to a vacuum system and arranged to operate on modern alternating current transmission and distributing systems.

It is a further object of the present invention to provide a complete switching system for modern alternating current transmission and distributing systems including those of the 3-phase type, which system includes the necessary apparatus for conditioning the switches thereof while in operating position and to provide in the apparatus a means by which, whenever one or more of the vacuum interrupters or breakers must be replaced, it may be readily conditioned after being inserted in the switching apparatus.

In accordance with the present invention, a switching apparatus is provided with the necessary means for properly resiliently mounting the individual interrupters and for properly connecting the same so that they may be simultaneously operated to open a circuit such as a 3-phase circuit. There is also contemplated within the present invention the provision of a system interconnecting the individual switches to a means for producing a high quality vacuum ambient for the individual system and a means for indicating the degree of vacuum of such ambients throughout the operation of the switching system.

In the preferred form of the invention, the system includes a means for initially conditioning the switches after the installation, a means for maintaining this condition and a means for reconditioning the switches at any time desired. The preferred form of the invention also includes a means for automatically maintaining a predetermined vacuum around the electrodes of the individual switches.

More particularly, the switching system included within the present invention provides for a number of vacuum alternating current power interrupters connected together with the vacuum tight piping system which interconnects the vacuum interrupters with pumping means for producing the desired vacuum. The vacuum piping system of the switching apparatus includes traps for catching mercury vapors from the vacuum pumps or any other vapors that may be present together with vacuum type valves for closing off and joining together sections of the vacuum system if desired, detectors for determining the degree of vacuum, and apparatus connected with the detectors for making automatic the operation of the vacuum pumps.

The present invention together with various additional objects and advantages thereof, will best be understood from the description of a preferred form or example of a vacuum switching apparatus embodying the invention. For this purpose, there is hereafter described such preferred switching apparatus, the description being given in connection with the accompanying drawings, in which:

Figure 1 is an elevation of the switching apparatus, and

Figure 2 is an enlarged elevation partially in vertical section of one of the individual interrupters and its mounting.

Referring to the drawings, 1 generally indicates a frame for mounting the switching apparatus, said frame mounts a plurality of individual circuit interrupters 2 of duplicate construction and preferably three in number, so that the system is operative for interrupting a 3-phase alternating current transmission line.

Each of the individual interrupters 2 includes a housing 3 preferably provided in its main part, by a glass bottle 4. The upper end of the glass bottle 4 is provided with a vacuum type seal with a corrugated flexible metallic connection 5 and the lower end of the glass bottle 4 is provided with a vacuum type seal with a metallic sylphon 6. The metallic connections 5 and 6 provide a resilient mounting for the glass bottle 4 and operate, in practice, to prevent damage or breakage of the bottle. The flexible connections 5 and 6 are preferably of copper or suitable iron alloy, as such materials make a most satisfactory seal to the glass bottle 4. The upper end of the flexible bellows 5 is attached to a stationary electrode 7 in a vacuum tight manner by soldering, brazing, or other convenient means.

The electrode 7 may be of any suitable material of which copper and aluminum are preferred, and extends down into the center of the bottle 4 and there is provided with an enlarged flat contact face 8. Just above the connection 5, the electrode 7 has a threaded portion 9 by which it is secured to and supported from a clamping plate 11. This clamping plate 11 is attached to the top plate 10 by means of several adjusting screws provided with jamb nuts 11a by means of which electrode 9 may be adjusted to align end 8 with end 26 so as to insure good contact. The cap 10 is provided with a cover 12, as indicated, and the electrodes 7 extends through the cover and may be connected by any desired means to one terminal of a 3-phase power circuit.

The cap 10 is supported upon a bushing 13 preferably of such material as porcelain, which bushing 13 operates to provide a weather protection for the glass bottle 4 of the switch and furnish mechanical support for the upper switch electrode. The bushing 13 in turn, at its lower end, is supported upon a plate 14 forming a part of a tri-pod stand 15, by which the individual current interrupters are mounted upon the frame 1 of the apparatus. As before described the glass housing 4 is flexibly mounted by the corrugated flexible members 5 and 6 and hence in practice does not contact with the plate 14.

The structure thus described provides a means by which each of the interrupters of the three phase systems may be adjusted to open simultaneously. The tri-pod stand 15 includes, on each of its legs, sufficient insulators 16, preferably of the standard post type, to properly insulate the switch from the frame of the apparatus against the high voltage placed across the interrupters. The tri-pod 15 includes above the insulators 16, a lower supporting plate 17, and between the plates 17, and 14, there are provided cylindrical post members 18. There is also bolted, or otherwise held to the plate 14, a retaining ring or shoe 19 which engages the outer sides of the bushing 13 at the bottom of said bushing.

The lower flexible bellows 6 is in turn welded or soldered in the vacuum tight manner to a metallic sleeve 20 which is held in a stationary position by being welded to a plate 21, through which the sleeve extends. The plate 21 is supported by three vertical rods 22 which are bolted to the lower plate 17 of the tri-pod. Between the plate 21 and the plate 14, the vacuum bottle is surrounded by a shielding 23 which operates as a weather protection and electrostatic shield. The lower end of the sleeve 20 is connected in a vacuum tight manner to a flexible member 24, preferably of copper, which is the operating bellows of the switch and provides a means by which a vacuum tight seal may be made within a moving electrode or contact 25. The moving electrode or contact 25 extends axially through the switch housing in alignment with the electrode 7 and has a flat contact face 26 adapted to make and break contact with the contact face 8. Electrode 25 is also preferably of copper or aluminum. 27 indicates a clamp connected with the rod 25 by which a main 28 may be connected with the moving electrode of the interrupter.

The lower end of the electrodes 25 passes through a bushing 30 in the plate 17 which operates as a guide for such electrode, the lower end of electrode 25 is connected pivotally and flexibly with an operating link 31. The operating link 31 is formed of or includes sufficient insulators 32, preferably of the standard post type, to protect the lower operating parts of the apparatus from the high voltage put across the interrupters proper.

In order to connect the links 31 to the operating electrode 25 of the interrupter, the operating electrode 25 is provided at its lower end with two spaced apart heads 33 and 34. A head 35 is loosely mounted upon the electrode 25 between the stops 33 and 34 and it is normally urged against the stop 33 by a spring 36. The head 35 is provided with trunnions 37 formed by bolts which pivotally connect the head to the link 31 by engaging a bifurcated member 38 at the upper end of said link.

By the construction thus described, the link 31 may be forced upwardly to make contact between the electrodes 25 and 7 without danger of damaging the vacuum housing, since any excess motion imparted to the link 31 is taken care of by the coil spring 36. The transmission of any shocks, due to the coming together of contacts 8 and 26 when electrode 25 is forced upward to the glass bottle 4 and its end seals, is precluded by the flexible metallic bellows 5 and 6 which are at opposite ends of the glass bottle 4 and located between the electrodes and the metal to glass vacuum seals.

The lower ends of each of the links 31 of the different interrupters 2 are all connected by rocker arms or bell cranks 39 to a common horizontal operating rod 40. The operating rod 40, at its end is connected by a bell crank 41 to the operating rod 42 of a solenoid 43, which is a means by which the interrupters are simultaneously caused to make and break their respective contacts.

Each of the interrupters 2 is permanently connected with the vacuum pumping and conditioning system and for this purpose, the sleeves 20 of said interrupters are connected by lines 44 including the vacuum tight valves 45, to a common pipe line 46. The pumping main 46 leads to a vacuum pumping system comprising suitable pumps and gas traps, which traps are for the purpose of preventing gases or vapors evolved in the diffusion pumps from creeping back through the main 46 and into the switch condensers. In the Figure 1, two traps 47 and 48 are shown, one of which is a simple liquid air trap whereby the mercury vapor from vacuum pump 52 may be frozen out of the line before it can travel back to the switch condensers. The other is a mechanical trap to make unnecessary a supply of liquid air to keep the air trap in operation. Valves 49 are located in relation to the traps and bypasses so that the trap 47 which is a chemical trap may be shut off from the pumping system until the system has been thoroughly outgassed and the switch conditioned for operation. After this is done, trap 48 is oscillated by valves 50 and the trap 47 made to function by opening of valve 49. The trap 48 connects through a valve 51 with a vacuum pump 52 which is shown as preferably of the mercury still type, including the mercury still 53 and condenser 54. From the condenser 54, a line 55 is shown connecting with a mechanically driven pump 56, vacuum bottle 57 and gauge 58. The pump 56, which serves as a fore pump, is preferably of the rotary mechanical type.

In order to maintain a predetermined vacuum within the interrupters, the still 53 of the mercury vacuum pump is preferably heated by a resister coil 59 which is connected with a source of energy 60 through a relay 61, actuated by a vacuum gauge 62 connected with the common line 46 of the individual interrupters. Various types of high vacuum gauges may be employed for operating the relay 61, but for this purpose I prefer to employ a gauge which consists essentially of a standard three-element vacuum tube 63 having a filament plate and a grid which is connected to and made a part of the vacuum piping system.

The filament 64 of such tube is energized by a battery 65 and the plate 66 of said tube is connected through a source of potential 67 and meter 68 to said filament. The meter 68 has its contact arranged to close the circuit from the source 60 through the solenoid 61, whenever the current flowing from the plate 66 reaches a predetermined value. The grid 69 of the tube is connected through a battery 70 and ammeter 71 with the filament 65.

While I have shown a gauge 62 connected with the heater 59 of the vacuum pump so as to automatically actuate the same, it is to be understood that the pump may be manually operated, if desired, and the gauge 62 employed merely to indicate the condition of the vacuum within the interrupters.

When the gauge 62 is to be used, a current of such magnitude as will heat the filament 64 to the required temperature, is passed through it. This causes the filament to emit the electrons which may be made to go to the grid by applying a potential 70 between the filament and grid in such a way as to make the grid positive with respect to the filament. These electrons, as they pass from the filament to the grid form ions by collision with any gas molecules which may be present within the interior of the tri-electrode tube which, of course, possesses the same gas pressure as the vacuum piping system and interrupters 2.

The second source of potential 67 applied between the filament and plate with the plate negative, causes the positive ions to travel to the plate. The meter 68, therefore, responds to the number of positive ions passing to the plate. The ratio of positive ion current to electron current is a measure of the amount of gas present in the vacuum system of which this gauge is a part.

The gauge has the advantage in that it may be made a part of an automatic system of vacuum control or maintenance. When employed as a part of an automatic system, the meter 68 is made to serve as a limiting relay to keep the vacuum between certain determined values of maximum and minimum gas pressure. For this purpose, a constant current, indicated by meter 71, is maintained through the grid circuit, thus making the readings of the meter 68 proportional to the gas pressure of the vacuum system.

The vacuum pressure of reservoir 57 and gauge 58 provide a means by which a circuit may be closed from the source 60 through a solenoid 72 of a relay which is designed to automatically close a circuit to the motor 73, which drives the fore pump 56. By this automatic operation of the fore pump 56, the pressure in the reservoir 57 is automatically maintained sufficiently low, so that the mercury pump 52 is always in condition to function properly.

The trap 47 is designed for freezing out any mercury vapors from pump 52 or any other vapors which, when not frozen out, tend to work back into the vacuum system and interfere with successful operation of the vacuum interrupters 2. The vapors are frozen out in trap 47 by surrounding the outside of the trap with liquid air or other extremely cold refrigerant, such as, carbon dioxide snow. 48 is another type of trap which keeps the gas from backing up into the part of the vacuum system where it is undesirable, by collecting the gas by chemical means. One type of means used for making this collection is to coat the interior parts of the trap 48 with metallic sodium. Any vapor coming in contact with the sodium unites with it and is thus kept from entering the vacuum switch chamber and causing the switch to fail in operation.

In operation, in order to condition the apparatus system so that it may successfully operate after the apparatus is assembled, the vacuum pumps are first set in operation to produce within the system the desired low potential or vacuum which is preferably as high as, for example, $10^5$ or $10^6$ millimeters of mercury.

A test electrode 75 is shown in the vacuum piping 46 which may serve as an additional means for indicating the extent of vacuum, particularly during the initial conditioning operations. By establishing between the test electrode 75 and one of the switch electrodes, a high potential, say 15,000 volts more or less, by means of a transformer induction coil or other power supply, the character of vacuum can be determined with sufficient accuracy for conditioning operations by the absence of glow or appearance of any glow produced by current flowing through the space inside of the vacuum piping between the electrode 75 and the interrupter electrode.

After the vacuum has been established the electrodes must be conditioned by a thorough outgassing process in order that they may interrupt large power currents successfully without arcing. For this purpose, there is preferably imposed between the electrodes 7 and 25 of the interrupters, a high electrical potential and the electrodes are opened to establish an arc between the electrodes. Before the arc is permitted to fuse the electrodes 7 or 25, the electrodes are either closed or the arc extinguished by other means and the vacuum pumps then operated to remove the gases excluded from the electrodes by the arcing operations. This operation is continued usually at successively higher voltages, until the electrodes will, when separated successfully, interrupt the current flow at the voltage at which the switch is intended to operate.

The switching appartus herein described permits all of the conditioning of electrodes of the interrupters to be carried on after the interrupters are assembled in their intended operating positions.

While the particular form of the invention herein described is well adapted to carry out the objects of the present invention, it is understood that various modifications and changes may be made, all within the spirit of the invention and the invention includes all such modifications and changes as come within the scope of the appended claim.

I claim:

A power circuit interrupter comprising, a tripod supporting stand, an interrupter housing, a a pair of relatively movable electrodes in said housing, a vacuum ambient for said housing, and a weather excluding bushing enclosing said housing and having flexible connection with said housing for supporting said housing.

ROYAL W. SORENSEN.